(12) United States Patent
Zhang et al.

(10) Patent No.: US 10,116,568 B2
(45) Date of Patent: Oct. 30, 2018

(54) SYSTEM AND METHOD FOR AUTOMATICALLY OPTIMIZING CAPACITY BETWEEN SERVER CLUSTERS

(71) Applicant: VMware, Inc., Palo Alto, CA (US)

(72) Inventors: Xianan Zhang, San Jose, CA (US); Eddie Ma, San Ramon, CA (US); Umit Rencuzogullari, Sunnyvale, CA (US); Irfan Ahmad, Mountain View, CA (US); Orran Krieger, Newton, MA (US); Mukil Kesavan, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 44 days.

(21) Appl. No.: 14/522,997

(22) Filed: Oct. 24, 2014

(65) Prior Publication Data

US 2015/0046586 A1  Feb. 12, 2015

Related U.S. Application Data

(62) Division of application No. 12/699,631, filed on Feb. 3, 2010, now Pat. No. 8,874,744.

(51) Int. Cl.
 *H04L 12/803* (2013.01)
 *G06F 15/173* (2006.01)
 (Continued)

(52) U.S. Cl.
 CPC .......... *H04L 47/125* (2013.01); *G06F 15/173* (2013.01); *H04L 43/0876* (2013.01); *G06F 9/455* (2013.01)

(58) Field of Classification Search
 CPC . H04L 12/5695; Y02B 60/142; Y02B 60/152; Y02B 60/167; G06F 2009/4557; G06F 9/505
 See application file for complete search history.

(56) References Cited

U.S. PATENT DOCUMENTS

| | | | |
|---|---|---|---|
| 6,185,601 B1 * | 2/2001 | Wolff | G06F 17/30067 |
| | | | 707/E17.005 |
| 6,571,288 B1 | 5/2003 | Sarukkai | |

(Continued)

FOREIGN PATENT DOCUMENTS

| | | | | |
|---|---|---|---|---|
| EP | 1269714 | * | 1/2003 | H04L 29/06 |
| EP | 1269714 B1 | | 1/2003 | |
| EP | 1832976 | * | 9/2007 | G06F 9/445 |

OTHER PUBLICATIONS

International Business Machines Corp. (IBM) 2007; "Logical Partitioning"; 2009.

*Primary Examiner* — Barbara B Anyan
(74) *Attorney, Agent, or Firm* — Loza & Loza, LLP

(57) ABSTRACT

A resource management system for a virtual machine computing environment includes a software component that optimizes capacity between server clusters or groups by monitoring the capacity of server clusters or groups and automatically adding and removing host systems to and from server clusters or groups. The software component may be implemented at a server cluster management level to monitor and execute host system moves between server clusters and/or at a higher level in the resource management hierarchy. At the higher level, the software component is configured to monitor and execute host system moves between sets of server clusters being managed by different server cluster management agents.

19 Claims, 8 Drawing Sheets

(51) Int. Cl.
*H04L 12/26* (2006.01)
*G06F 9/455* (2018.01)

(56) References Cited

U.S. PATENT DOCUMENTS

| | | | |
|---|---|---|---|
| 7,543,060 B2 * | 6/2009 | Ishida | H04L 67/1008 709/223 |
| 7,716,373 B2 | 5/2010 | Hamanaka et al. | |
| 8,286,165 B2 | 10/2012 | Miyata et al. | |
| 2003/0003997 A1 * | 1/2003 | Vuong | G07F 17/32 463/42 |
| 2003/0061362 A1 * | 3/2003 | Qiu | H04N 7/165 709/229 |
| 2005/0038834 A1 * | 2/2005 | Souder | G06F 9/5027 |
| 2008/0021988 A1 * | 1/2008 | Abernethy | H04L 67/1008 709/223 |
| 2008/0172312 A1 * | 7/2008 | Synesiou | G06Q 10/00 705/34 |
| 2009/0106571 A1 * | 4/2009 | Low | G06F 9/4856 713/310 |
| 2011/0022689 A1 * | 1/2011 | Piepenbrink | H04L 12/4679 709/221 |
| 2011/0055370 A1 * | 3/2011 | Kern et al. | 709/224 |
| 2011/0138019 A1 | 6/2011 | Bae et al. | |

* cited by examiner

SYSTEM AND METHOD FOR AUTOMATICALLY OPTIMIZING CAPACITY BETWEEN SERVER CLUSTERS

CROSS-REFERENCE TO RELATED APPLICATIONS

This patent application is a divisional of U.S. application Ser. No. 12/699,631, filed on Feb. 3, 2010, which is incorporated herein by reference.

BACKGROUND

Computer virtualization is a technique that involves encapsulating a physical computing machine platform into a virtual machine that is executed under the control of virtualization software on a hardware computing platform. Virtualization software enables multiple virtual machines to be run on a single hardware computing platform, and can manage the allocation of computing resources to each virtual machine.

A set of hardware computing platforms can be organized as a server cluster to provide computing resources for example, for a data center. In addition, supporting technology can move running virtual machines between servers (also referred to herein as "host systems") in the cluster; an example of this supporting technology is sold as VMware VMotion™ by VMware, Inc. of Palo Alto, Calif. In addition, server cluster virtualization management software that incorporates cluster resource management technology can determine initial and ongoing locations of virtual machines on hardware computing platforms in the server cluster, and can manage the allocation of cluster computing resources. An example of this server cluster virtualization management software is sold as VMware Distributed Resource Scheduler™ by VMware, Inc. of Palo Alto, Calif. (hereinafter referred to as "DRS"). In addition, the server cluster virtualization management software can request that a server in the cluster power itself down, and can use mechanisms available in the marketplace to remotely power-on a server that is powered down. An example of this power management software is sold as the VMware Distributed Power Management feature within DRS by VMware, Inc. of Palo Alto, Calif. (hereinafter referred to as "DPM").

Current implementations of DRS limit the cluster size to a certain number (N) of servers. As a consequence, resource management has to be carried out in groups of N servers or less. For data centers that operate considerably more than N servers and data centers that operate multiple groups of servers where each group is dedicated to a different customer or has a particular server configuration, DRS cannot ensure optimized resource management. Although resource usage within any single group of servers may be balanced using DRS, adding capacity to an overloaded group of servers cannot be easily done.

SUMMARY

One or more embodiments of the present invention provide a system and a method for automatically optimizing capacity between server clusters or groups that support a virtual machine computing environment. Such a system and method enable the balancing of resources across server clusters or groups and provides inter-cluster or inter-group resource sharing without compromising the isolation aspect of a server cluster or a server group.

According to this system and method, a software component monitors the capacity of server clusters or groups and automatically adds and removes host systems to and from server clusters or groups. The software component may be implemented at a server cluster management level to monitor and execute host system moves between server clusters and/or at a higher level in the resource management hierarchy. At the higher level, the software component is configured to monitor and execute host system moves between sets of server clusters being managed by different server cluster management agents.

A method of allocating physical computing resources in a virtual machine computing environment, according to an embodiment of the present invention, includes the steps of computing a usage metric of a multiple groups of server computers, determining a load imbalance between the groups, evacuating a host system in an under-utilized group, and allocating the evacuated host system to an over-utilized group. The host system move from the under-utilized group to the over-utilized group is carried out when the overall utilization is high enough. In situations where overall utilization is low, the host system move is not carried out although load imbalance has been determined.

A method of allocating physical computing resources in a virtual machine computing environment, according to another embodiment of the present invention, includes the steps of computing a usage metric of a group of server computers, determining a load imbalance for the group, and allocating an additional server computer to the group if the group is overloaded and deallocating one of the server computers of the group if the group is underloaded.

A hierarchical resource management system according to an embodiment of the present invention includes a plurality of first level resource managers, each configured to monitor a load imbalance across two or more clusters of server computers, and a second level resource manager configured to monitor a load imbalance between groups of server computers, where each group is monitored by one of the first level resource managers.

Other embodiments of the present invention include, without limitation, a computer-readable storage medium that includes instructions that enable a processing unit to implement one or more aspects of the disclosed methods as well as a system configured to implement one or more aspects of the disclosed methods.

DETAILED DESCRIPTION

Figure 1:
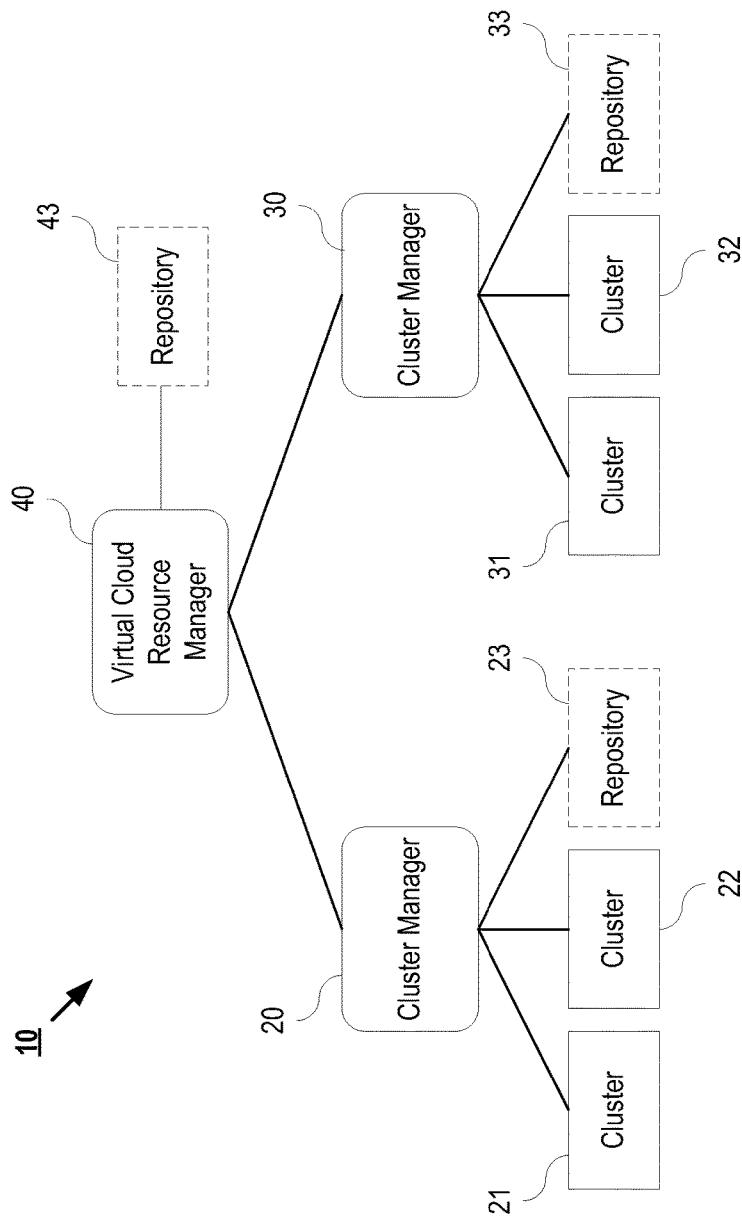
FIG. 1 is a schematic diagram of a hierarchical resource management system according to an embodiment of the present invention.

FIG. 1 is a schematic diagram of a hierarchical resource management system 10 according to an embodiment of the present invention. Two levels of resource management are shown in FIG. 1 for simplicity. An embodiment of the present invention may be practiced with additional (higher) levels, e.g., a third level. A third level resource manager would operate similarly to a second level resource manager except that the third level resource manager would collect statistics data from and recommend host system moves to the second level resource managers (one of which is shown in FIG. 1 as cloud resource manager 40). At the first level, cluster managers 20, 30 are managing resources for their respective server clusters. At the second level, virtual cloud resource manager 40 is managing resources for server clusters managed by cluster managers 20, 30. Resources being managed by system 10 are physical resources, namely server computers (or host systems) contained in server clusters 21, 22, 31, 32 and server repositories 23, 33. Server clusters 21, 22 and server repository 23 are under the control of cluster manager 20 and server clusters 31, 32 and server repository 33 are under the control of cluster manager 30. Cluster manager 20 and cluster manager 30 are server computers each programmed to manage its respective server clusters and server repository in the manner described herein.

Figure 2:
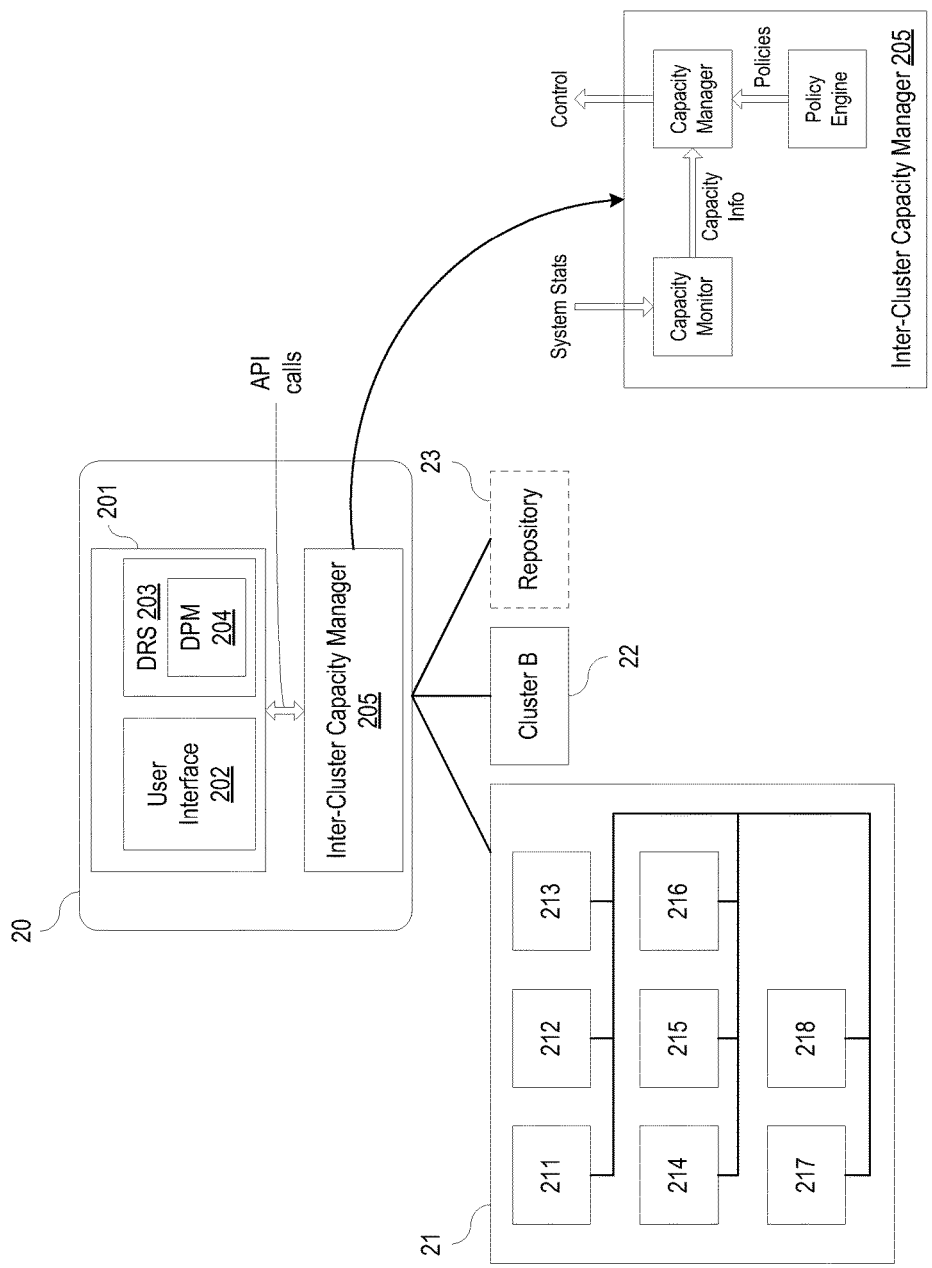
FIG. 2 illustrates the components of the hierarchical resource management system of FIG. 1 in additional detail.

The components of cluster manager 20 are detailed in FIG. 2. Cluster manager 30 includes the same components except they are used to manage server clusters 31, 32 and server repository 33. The components of cluster manager 20 include a server cluster virtualization management software 201 which comprises a user interface 202, DRS module 203, and a DPM module 204. An inter-cluster capacity manager 205 is implemented as an extension to server cluster virtualization management software 201 and communicates with server cluster virtualization management software 201 using Application Programming Interface (API) calls. Inter-cluster capacity manager 205 has three modules. The first module is a capacity monitor which collects at periodic intervals resource usage statistics. In one embodiment, resource usage statistics that are collected include the total idle capacity of each cluster managed by cluster manager 20. In another embodiment, resource usage statistics that are collected include entitlement data for each running virtual machine (VM). Entitlement data for a VM at a point in time signifies the amount of resources the VM is entitled to at that point in time. The resource usage statistics may be supplied by a software component inside server cluster virtualization management software 201 that is separate from DRS module 203 or they may be supplied by DRS module 203. The second module is a policy engine which stores information (policy) on how resources are to be allocated to each server cluster. The third module is a capacity balancer which receives inputs from the capacity monitor and the policy engine and makes decisions on host system moves accordingly. In one embodiment, the capacity balancer makes host system move decisions less frequently than entitlement data collection, because it may be desirable to analyze capacity trends prior to making a move decision. In either case, the frequency of data collection and the frequency of host system move decisions are configurable parameters. In another embodiment, as will be further described below, the capacity balancer makes host system move decisions by comparing a statistical measure of variance between normalized entitlements of server clusters.

In the embodiment described above, inter-cluster capacity manager 205 is shown as an extension of server cluster virtualization management software 201. In alternative embodiments, inter-cluster capacity manager 205 may be a stand-alone software component that periodically polls each of the clusters for resource usage statistics or a software component inside server cluster virtualization management software 201 that periodically polls each of the clusters for resource usage statistics.

FIG. 2 further illustrates a representative structure for a server cluster. In the illustration, the components of server cluster 21 are shown but it should be understood that server clusters 22, 31, 32 have substantially the same structure, although the number of host systems can differ. Server cluster 21 includes a plurality of host systems 211-218 that are grouped or clustered together (physically or logically). Eight host systems 211-218 are shown here; however, in practice, server cluster 21 may include an arbitrary number of host systems.

A server repository 23 or 33 is a logical group of host systems that are made available for any of the server clusters to utilize. Some are powered off to preserve power consumption. Others are left powered on and booted for quick deployment.

Figure 3:
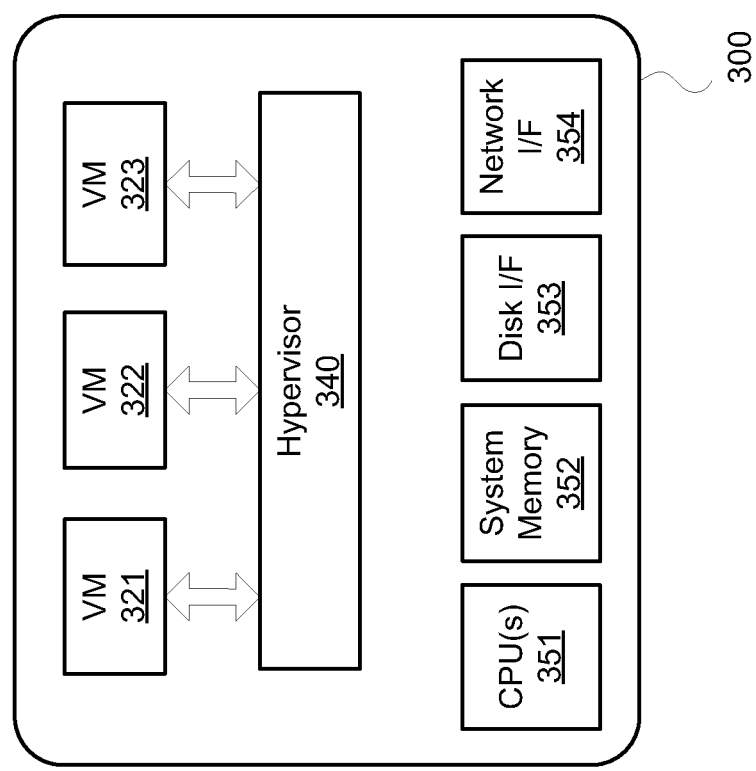
FIG. 3 is a block diagram representing an example of a host system included in a cluster of servers shown in FIG. 1.

FIG. 3 is a block diagram of a host system 300 in which one or more VMs are running and is representative of a host system in any of the server clusters. Host system 300 is the physical platform for one or more VMs (e.g., VM 321, VM 322, and VM 323) and has conventional hardware resources of a computing device, such as one or more CPUs 351, system memory 352, disk interface 353, and network interface 354. Examples of disk interface 353 are a host bus adapter and a network file system interface. An example of network interface 354 is a network adapter. The VMs run on top of a hypervisor (or virtual machine monitor) 340, which is a software interface layer that enables sharing of the hardware resources of host system 300. Persistent data storage is served by a storage device (not shown) connected via disk interface 353.

Figure 4:
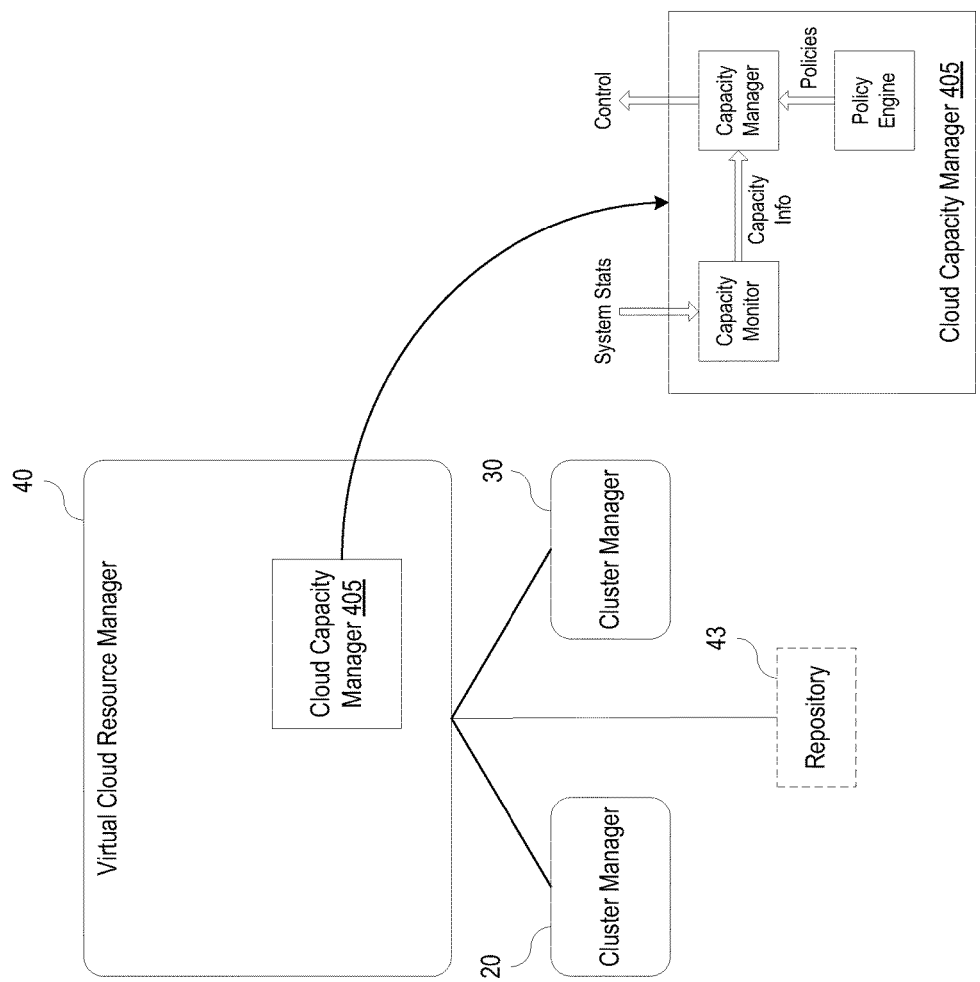
FIG. 4 illustrates the virtual cloud resource manager of FIG. 1 in additional detail.

FIG. 4 illustrates the virtual cloud resource manager of FIG. 1 in additional detail. The components of virtual cloud resource manager 40 include a software component referred to herein as a cloud capacity manager 405. Cloud capacity manager 405 has three modules. The first module is a capacity monitor which collects resource usage statistics from cluster managers 20, 30. The second module is a policy engine which stores information (policy) on how resources are to be allocated to each set of clusters managed by cluster managers 20, 30. The third module is a capacity balancer which receives inputs from the capacity monitor and the policy engine, and makes decisions on host system moves accordingly.

A server repository 43 is a logical group of host systems that are made available by virtual cloud resource manager 40 for either cluster manager 20, 30 to allocate. Some are powered off to preserve power consumption. Others are left powered on and booted for quick deployment.

Figure 5A:
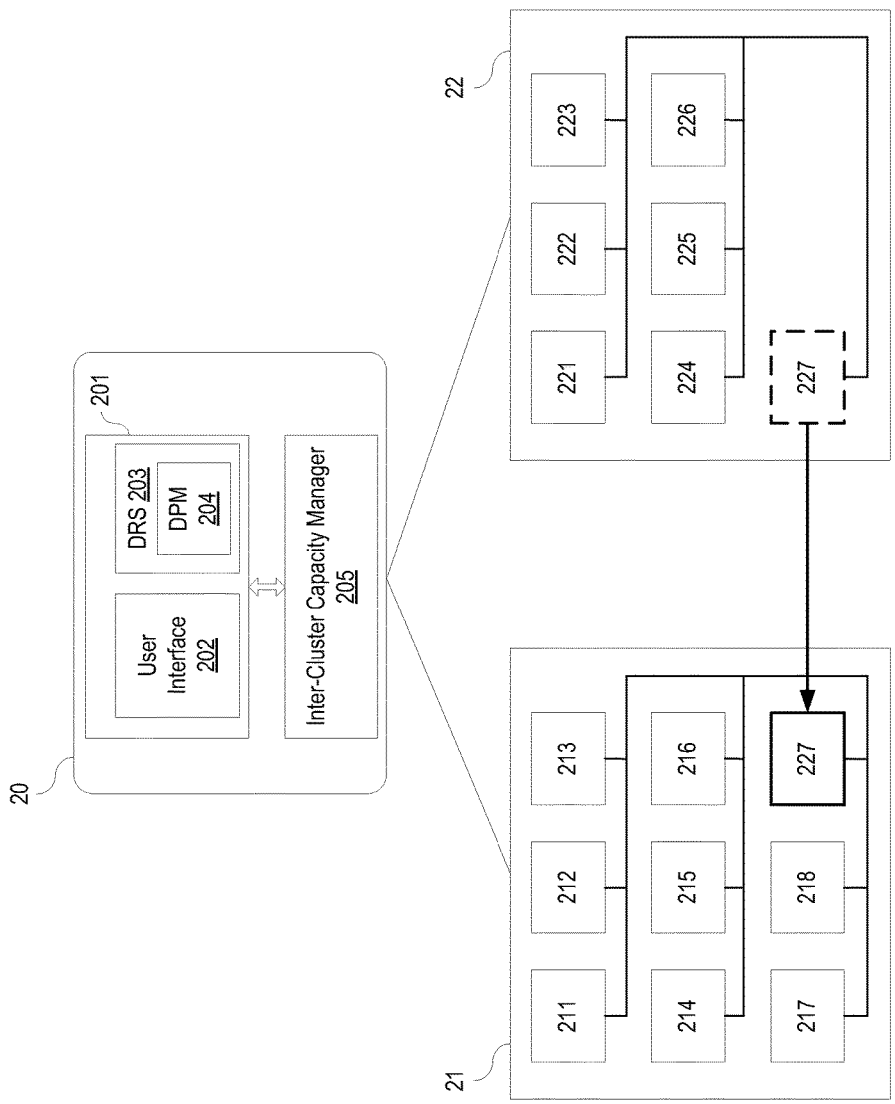
FIGS. 5A and 5B conceptually illustrate the process of moving a host system from one server cluster to another server cluster.

FIG. 5A conceptually illustrates the process of moving a host system directly from one server group to another server group. The host system that is moved is initially contained in server cluster 22. When cluster manager 20 determines through inter-cluster capacity manager 205 that server cluster 22 is underutilized and that server cluster 21 is overutilized, it deallocates a host system within server cluster 22 by evacuating the VMs running therein and making the host system available for server cluster 21. In the example shown, host system 227 is selected for deallocation and is made available for allocation by server cluster 21. The selection of host system 227 among all host systems running in server cluster 22 may be determined through any heuristic, e.g., host system with the smallest total entitlement. More complicated heuristics, e.g., the heuristic implemented in DPM 204 to select the host system to power down, may also be used.

Figure 5B:
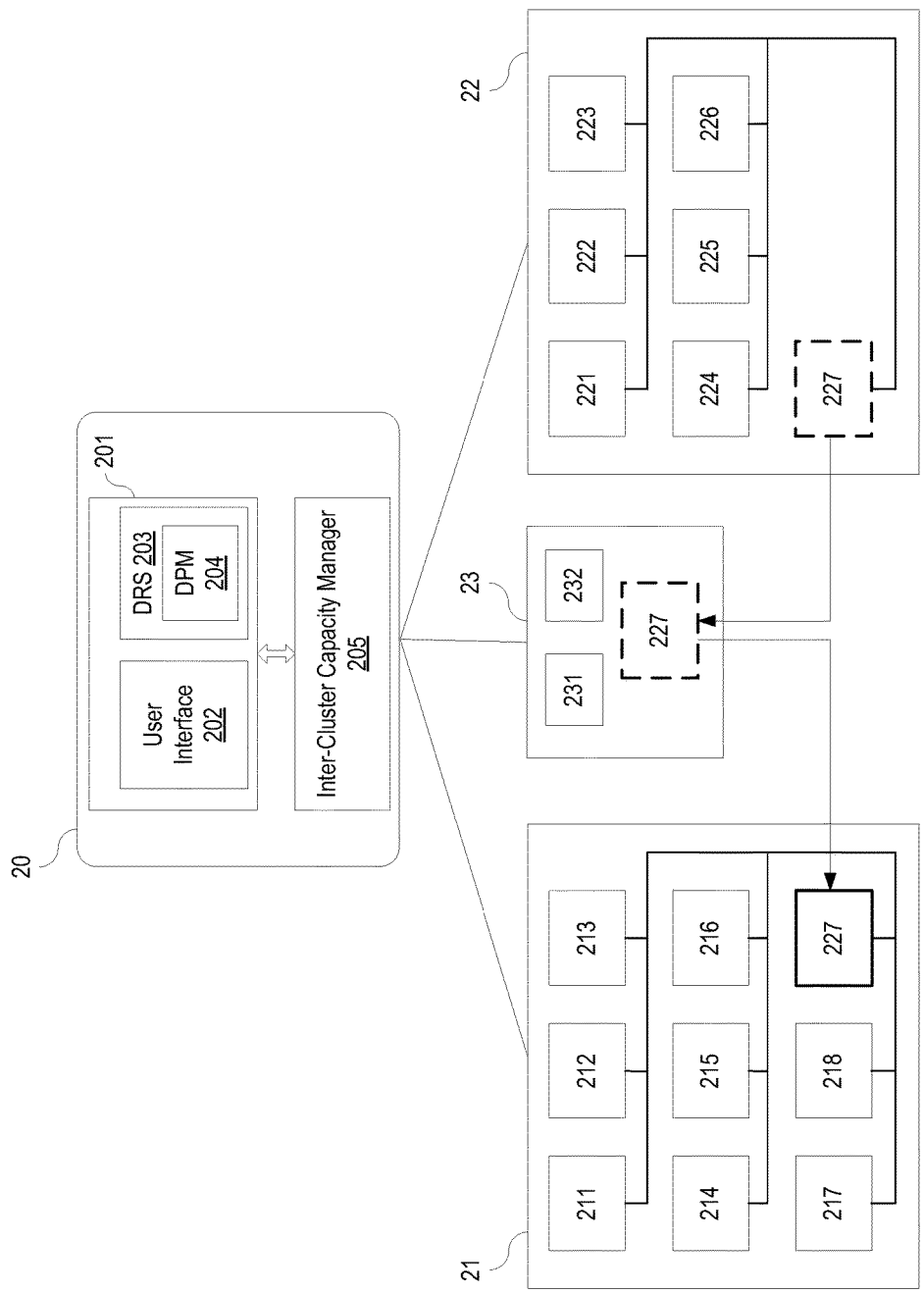

FIG. 5B conceptually illustrates the process of moving a host system from one server group to another server group via a server repository 23. The host system that is moved into server repository 23 is initially contained in server cluster 22. When cluster manager 20 determines through inter-cluster capacity manager 205 that server cluster 22 is underutilized, it deallocates a host system within server cluster 22 by evacuating the VMs running therein and making the host system available for server cluster 21. In the example shown, host system 227 is selected for deallocation and is made available for allocation by another server cluster by logically placing host system 227 in server repository 23. The selection of host system 227 is made in the manner previously described.

Then, at a later time, when cluster manager 20 determines through inter-cluster capacity manager 205 that server cluster 21 is overutilized, it allocates a host system from server repository 23 (e.g., host system 227) to server cluster 21. FIG. 5B also shows host systems 231, 232 within server repository 23. Cluster manager 20 may also allocate host system 231 or 232 to server cluster 21, as needed. In addition, if server cluster 22 becomes overutilized, cluster manager 20 may also allocate host system 231 or 232 to server cluster 22, as needed. For quicker deployment, any of host systems 231, 232, 227 in server repository 23 may be kept in a powered-on state. If power conservation is of higher priority, one or more of host systems in server repository 23 may be powered off. In certain instances, e.g., in situations where no cluster seems to be close to needing additional resources, host systems in server repository 23 may be powered off in a more aggressive manner. There also may be situations where a set number of host systems in server repository 23, the set number being configurable, are kept powered on and the rest are powered off. In all of these different scenarios, the powered-off host systems need to be remotely powered on and booted for deployment.

Figure 6:
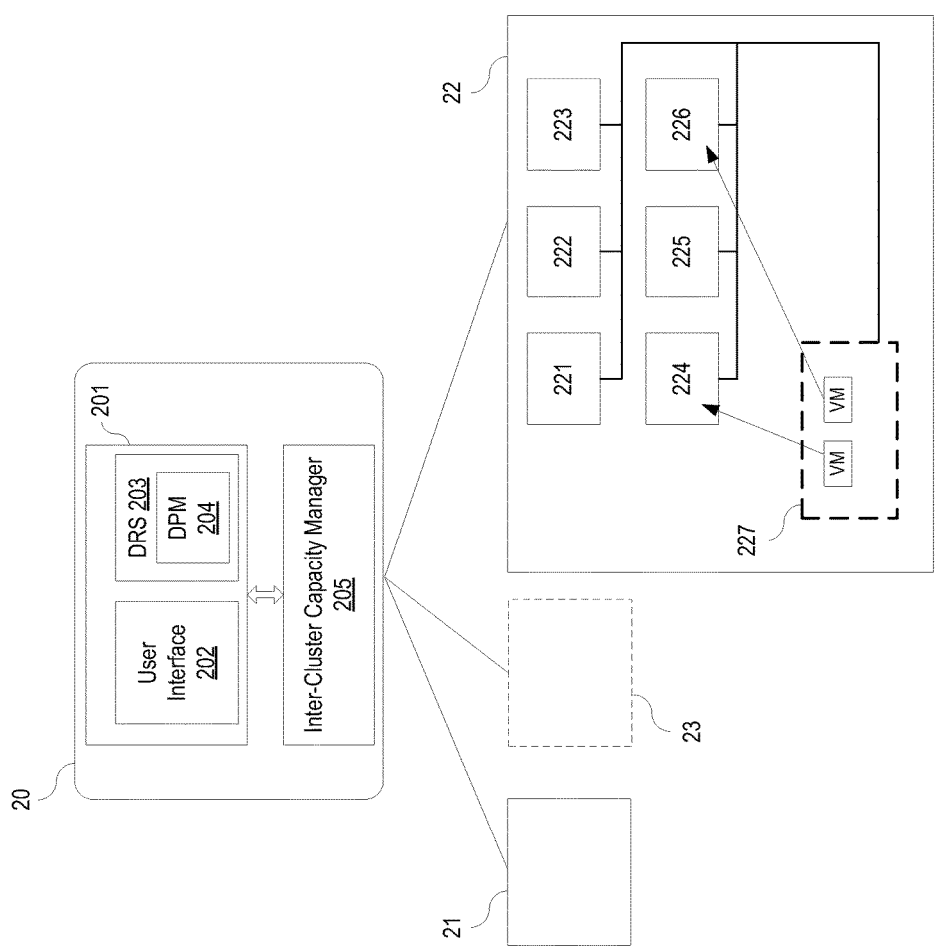
FIG. 6 conceptually illustrates the process of evacuating a host system prior to moving the host system to a repository or another server cluster.

FIG. 6 conceptually illustrates the process of evacuating a host system prior to moving the host system to a repository or to another server group. In this example, host system 227 has been selected for deallocation. Two VMs are shown running in host system 227 and thus they need to be moved to other host systems within server cluster 22. As shown, one VM is moved to host system 224 and the other VM is moved to host system 226. In one embodiment, the selection of destination host systems is made by DRS and the VMs are moved using VMware's VMotion™ technology. After evacuation, host system 227 is allocated to server cluster 21 in the embodiment of FIG. 5A or logically placed into server repository 23 for subsequent allocation in the embodiment of FIG. 5B.

Figure 7:
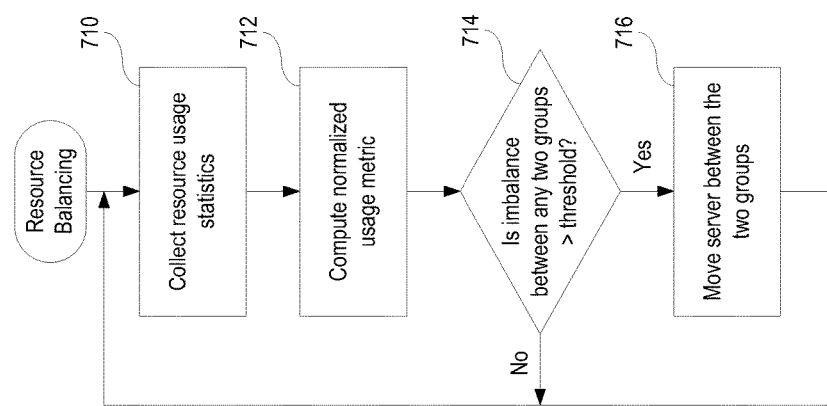
FIG. 7 is a flow diagram that depicts the steps carried out to balance resource usage between server clusters or server groups.

FIG. 7 is a flow diagram that depicts the steps carried out to balance resource usage between server clusters or server groups. This method may be carried out by a cluster manager through its inter-cluster capacity manager or by a virtual cloud resource manager through its cloud capacity manager. In step 710, resource usage statistics (in particular, entitlement data) are collected at regular intervals of time for each running VM. The entitlement data can be obtained using an API call into DRS. Entitlement data for a VM at a point in time signify the amount of resources the VM is entitled to at that point in time. Therefore, the total entitlement for all VMs running in a server cluster or in any server group signifies the amount of resources that are entitled to the VMs running in that server cluster or server group. In step 712, a normalized entitlement for each server cluster or server group is computed by dividing the total entitlement by a number representing the total processing power and memory capacity of the server cluster or server group.

The equations for computing the normalized entitlement for a group of server clusters managed by a cluster manager (also referred to as Virtual Center or VC, for short), and at the cloud level are provided below. In the equations below, $E_{VM}$ is the entitlement value for a VM, $E_C^{DRS}$ entitlement for a cluster C as calculated by DRS, $\ddot{E}_C^{DRS}$ entitlement for a cluster C as adjusted for statistical smoothing, $E_{VC}^{VC}$ is the total entitlement for a group of clusters managed by one cluster manager VC as calculated at the VC layer and $\ddot{E}_{VC}^{VC}$ its statistically adjusted value. $NE_C$ is the normalized entitlement for a server cluster C. $NE_{VC}$ is the normalized entitlement for a group of server clusters managed by a cluster manager VC.

$E_C^{DRS} = \Sigma E_{VM}$ (summation is done over all of the VMs in the cluster C)

$\ddot{E}_C^{DRS}$ = mean (recent values of $E_C^{DRS}$) + two times the standard deviation from this mean $E_{VC}^{VC} = \Sigma \ddot{E}_C^{DRS}$ (summation is done over all of the clusters C managed as a group by a VC)

$\ddot{E}_{VC}^{VC}$ = mean (recent values of $E_{VC}^{VC}$) + two times the standard deviation from this mean $NE_C = \ddot{E}_C^{DRS}$/total resource capacity of server cluster C $NE_{VC} = \ddot{E}_{VC}^{VC}$/total resource capacity of a group of server clusters managed by VC In the equations above, the entitlement value represents either processing power or memory capacity, and the normalized entitlement is calculated separately for each resource.

In step 714, the normalized entitlements of two server clusters or server groups are compared to determine imbalance. In one example, the normalized entitlement of server cluster 21 is compared with the normalized entitlement of server cluster 22 to determine if there is any imbalance between these two server clusters. In another example, the normalized entitlement of a first server group containing host systems in server clusters 21, 22 is compared with the normalized entitlement of a second server group containing host systems in server clusters 31, 32. If there is no imbalance, i.e., the difference between the two normalized entitlements is less than a predetermined threshold, the flow returns to step 710. If there is an imbalance, i.e., the difference between the two normalized entitlements is greater than a predetermined threshold, step 716 is executed. In step 716, a host system from the server cluster or server group with the lower normalized entitlement is evacuated and allocated to the server cluster or server group with the higher normalized entitlement. The movement of the host system can be carried out by making API calls into server cluster virtualization management software 201 to move the host system out of one server cluster and into another server cluster.

When determining imbalance, processing power imbalance may be evaluated, or memory capacity imbalance may be evaluated, or an overall imbalance may be evaluated. The overall imbalance is a weighted combination of the imbalance on each resource. The weight value for each is configurable and defaults to 0.25 for processing power and 0.75 for memory capacity.

In one embodiment, the decision block in step 714 is carried out with less frequency than steps 710 and 712. Consequently, the decision on whether there is an imbalance is made by comparing the running averages of the normalized entitlements.

In one embodiment, the decision block in step 714 is carried out by comparing a statistical measure of variance between the normalized entitlements of server clusters or server groups. In one example, the variance (e.g., standard deviation) of normalized entitlements of server cluster 21 and server cluster 22 is calculated. If the variance (e.g., standard deviation) is above a user specified threshold, a host system is evacuated from the server cluster with the lower normalized entitlement and allocated to the server repository or a server cluster with the higher normalized entitlement. After such a move, the variance (e.g., standard deviation) is computed again and the process is repeated until no further moves are possible or the variance is below the threshold. In a similar manner, variance can be used to determine the imbalance between server groups.

A systematic search can be carried out to find a spare host system for one or more overloaded clusters. First, the server repository is examined and the spare host system is allocated from the server repository, if one is available. If not, the underloaded clusters and clusters in equilibrium are sorted in ascending order of normalized entitlement, and beginning from the top, look for host systems that have been powered down, and if none, select a host system from the most underloaded cluster.

In some embodiments of the present invention, the host system move from the under-utilized group to the over-utilized group may not be always carried out although the load imbalance is sufficiently high. In situations where overall utilization is low, e.g., the maximum normalized entitlement of the server clusters or groups is less than a predefined threshold, the host system move is not carried out although load imbalance is sufficiently high.

Figure 8:
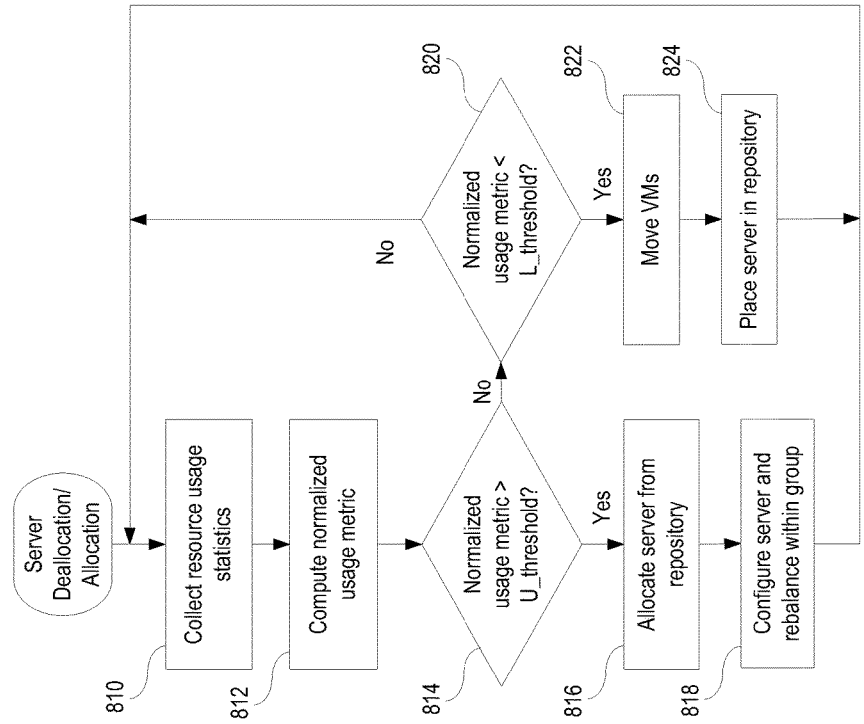
FIG. 8 is a flow diagram that depicts the steps carried out to allocate or deallocate a host system.

FIG. 8 is a flow diagram that depicts the steps carried out to allocate or deallocate a host system. This method may be carried out by a cluster manager through its inter-cluster capacity manager or by a virtual cloud resource manager through its cloud capacity manager. In this example, the host system is allocated from a server repository and configured with a default host profile, and, after deallocation, the host system is logically placed into a server repository. In step 810, resource usage statistics (in particular, entitlement data) are collected at regular intervals of time for each running VM. The entitlement data can be obtained using an API call into DRS. Entitlement data for a VM at a point in time signify the amount of resources the VM is entitled to at that point in time. Therefore, the total entitlement for all VMs running in a server cluster or in any server group signifies the amount of resources that are entitled to the VMs running in that server cluster or server group. In step 812, a normalized entitlement for the server cluster or server group is computed by dividing the total entitlement by a number representing the total processing power and memory capacity of the server cluster or server group. In step 814, the normalized entitlement is compared to a predetermined upper threshold value. If the normalized entitlement is not greater than the upper threshold value, the normalized entitlement is compared to a predetermined lower threshold value. If the normalized entitlement is not less than the lower threshold value, the flow returns to step 810.

On the other hand, if the normalized entitlement is greater than the upper threshold value, steps 816 and 818 are carried out, or if the normalized entitlement is less than the lower threshold value, steps 822 and 824 are carried out. In step 816, a host system is allocated to the server cluster or server group from the server repository. Then, in step 818, the host system is configured according to a default host profile of the server cluster to which it was added and DRS performs balancing of the workloads within that server cluster. In step 822, a host system is selected from the server cluster or server group according to heuristics previously discussed and evacuated. Then, in step 824, the evacuated host system is logically placed in the server repository. The movement of the host system can be carried out by making API calls into server cluster virtualization management software 201 to move the host system out of a server cluster or server repository and into a server cluster or server repository.

In one embodiment, the decision blocks in steps 814 and 820 are carried out with less frequency than steps 810 and 812. Consequently, the decision on whether there is an imbalance is made by comparing the running averages of the normalized entitlements against the thresholds. In alternative embodiments, if a sudden rise in normalized entitlement is detected, the decision block in step 814 may be executed earlier than its scheduled time so that the sudden rise in processing and/or memory demands can be met in a timely manner.

In addition, various policies for resource management may be specified. For example, a default low limit and a default high limit may be defined for all server clusters. For some server clusters, these limits may be overridden with custom values. When the percentage of spare capacity is below the low limit, then a host system is added to the server cluster. When the percentage of spare capacity is above the high limit, then a host system is removed from the server cluster. If the low limit is 0% and the high limit is 100% for a server cluster, that server cluster will not be monitored.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), such as CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A hierarchical resource management system comprising:
   a plurality of first level resource managers, including a particular first level resource manager configured to monitor a load imbalance across a first group of clusters of server computers and another first level resource manager configured to monitor a load imbalance across a second group of clusters of server computers;
   a second level resource manager configured to monitor a load imbalance between the first group of server computers monitored by the particular first level resource manager and the second group of server computers monitored by the another first level resource manager; and
   a control module configured to compare a variance between normalized resource entitlements of the clusters of server computers, which are calculated based on mean values of resource entitlements of the clusters of server computers and standard deviations from the mean values, and a threshold and to deallocate a server computer from one of the clusters of server computers by evacuating at least one client running on the server computer based on the comparison of the variance between the normalized resource entitlements of the clusters of server computers and the threshold.

2. The system of claim 1, wherein the control module, provided in each first level resource manager, is configured to allocate an additional server computer to one of the other clusters of server computers based on the load imbalance monitored by the first level resource manager.

3. The system of claim 1, wherein the deallocated server is placed in a resource pool and allocated to a cluster from the resource pool.

4. The system of claim 1, further comprising:
   another control module, provided in the second level resource manager, that is configured to allocate an additional server computer to one of the first group and the second group based on the load imbalance monitored by the second level resource manager.

5. The system of claim 4, wherein the another control module is further configured to deallocate a server computer from the other one of the first group and the second group based on the load imbalance monitored by the-second level resource manager, wherein the deallocated server is placed in a resource pool and allocated to a cluster from the resource pool.

6. The system of claim 1, wherein one or more of the first level resource managers are configured to:
   compute a usage metric of at least two clusters of server computers to determine a first usage measure for a first cluster and a second usage measure for a second cluster;
   determine a load imbalance across the clusters, including comparing the first usage measure to the second usage measure and including using the comparing as a basis for detecting a condition in which balancing is to be executed, the condition being at least partially based upon a difference between the first and second usage measures; and
   as a response to detecting from the comparing that balancing is to be executed, evacuate a server computer identified from an underloaded cluster and allocate the evacuated server computer to an overloaded cluster.

7. The system of claim 1, wherein the control module is configured to:

if the variance is above the threshold, deallocate the server computer from a server cluster with a lower normalized entitlement and allocate the server computer to a server repository or a server cluster with a higher normalized entitlement.

8. The system of claim 7, wherein the control module is configured to:

after the server computer is deallocated from the server cluster with the lower normalized entitlement and allocated to the server repository or the server cluster with the higher normalized entitlement, re-compute the variance between the normalized resource entitlements of the clusters of server computers and deallocate a second server computer from a server cluster with a lower normalized entitlement and allocate the second server computer to a server repository or a server cluster with a higher normalized entitlement until the variance is below the threshold.

9. A resource management method comprising:

monitoring a load imbalance across two or more clusters of server computers by each of a plurality of first level resource manager, including monitoring a load imbalance across a first group of clusters of server computers by a particular first level resource manager and monitoring a load imbalance across a second group of clusters of server computers by another first level resource manager;

monitoring a load imbalance between the first group of server computers monitored by the particular first level resource manager and the second group of server computers monitored by the another first level resource manager by a second level resource manager; and comparing a variance between normalized resource entitlements of the clusters of server computers, which are calculated based on mean values of resource entitlements of the clusters of server computers and standard deviations from the mean values, and a threshold and deallocating a server computer from one of the clusters of server computers by evacuating at least one client running on the server computer based on the comparison of the variance between the normalized resource entitlements of the clusters of server computers and the threshold, wherein the monitoring steps are performed using one or more computers.

10. The resource management method of claim 9, further comprising:

allocating an additional server computer to one of the other clusters of server computers based on the load imbalance monitored by the one of the first level resource managers.

11. The resource management method of claim 9, further comprising:

placing the deallocated server in a resource pool; and allocating the deallocated server in the resource pool to a cluster.

12. The resource management method of claim 9, further comprising:

allocating an additional server computer to one of the first group and the second group based on the load imbalance monitored by the second level resource manager.

13. The resource management method of claim 12, further comprising:

deallocating a server computer from the other one of the first group and the second group based on the load imbalance monitored by the second level resource manager;

placing the deallocated server in a resource pool; and allocating the deallocated server in the resource pool to a cluster.

14. The resource management method of claim 9, further comprising:

computing a usage metric of at least two clusters of server computers to determine a first usage measure for a first cluster and a second usage measure for a second cluster;

determining a load imbalance across the clusters, including comparing the first usage measure to the second usage measure and including using the comparing as a basis for detecting a condition in which balancing is to be executed, the condition being at least partially based upon a difference between the first and second usage measures; and as a response to detecting from the comparing that balancing is to be executed, evacuate a server computer identified from an underloaded cluster and allocate the evacuated server computer to an overloaded cluster.

15. A non-transitory computer-readable storage medium comprising executable instructions for resource management, wherein the instructions, when executed in a computer system, cause the computer system to carry out the steps of:

monitoring a load imbalance across two or more clusters of server computers by each of a plurality of first level resource manager, including monitoring a load imbalance across a first group of clusters of server computers by a particular first level resource manager and monitoring a load imbalance across a second group of clusters of server computers by another first level resource manager;

monitoring a load imbalance between the first group of server computers monitored by the particular first level resource manager and the second group of server computers monitored by the another first level resource manager by a second level resource manager; and comparing a variance between normalized resource entitlements of the clusters of server computers, which are calculated based on mean values of resource entitlements of the clusters of server computers and standard deviations from the mean values, and a threshold and deallocating a server computer from one of the clusters of server computers by evacuating at least one client running on the server computer based on the comparison of the variance between the normalized resource entitlements of the clusters of server computers and the threshold.

16. The non-transitory computer-readable storage medium of claim 15, wherein the steps further comprise:

allocating an additional server computer to one of the other clusters of server computers based on the load imbalance monitored by the one of the first level resource managers.

17. The non-transitory computer-readable storage medium of claim 15, further comprising:

placing the deallocated server in a resource pool; and allocating the deallocated server in the resource pool to a cluster.

18. The non-transitory computer-readable storage medium of claim 15, further comprising:
- allocating an additional server computer to one of the first group and the second group based on the load imbalance monitored by the second level resource manager;
- deallocating a server computer from the other one of the first group and the second group based on the load imbalance monitored by the second level resource manager;
- placing the deallocated server in a resource pool; and
- allocating the deallocated server in the resource pool to a cluster.

19. The non-transitory computer-readable storage medium of claim 15, further comprising:
- computing a usage metric of at least two clusters of server computers to determine a first usage measure for a first cluster and a second usage measure for a second cluster;
- determining a load imbalance across the clusters, including comparing the first usage measure to the second usage measure and including using the comparing as a basis for detecting a condition in which balancing is to be executed, the condition being at least partially based upon a difference between the first and second usage measures; and
- as a response to detecting from the comparing that balancing is to be executed, evacuate a server computer identified from an underloaded cluster and allocate the evacuated server computer to an overloaded cluster.

* * * * *